UNITED STATES PATENT OFFICE 2,200,216

PRODUCTION OF HIGH-MOLECULAR UN-SATURATED KETONES AND CONVERSION PRODUCTS THEREOF

Kurt Loewenberg and Karl Smeykal, Leuna, Germany, assignors to I. G. Farbenindustrie Aktiengesellschaft, Frankfort - on - the - Main, Germany No Drawing. Application February 10, 1937, Serial No. 125,064. In Germany February 14, 1936

7 Claims. (Cl. 260—593)

The present invention relates to a process for the production of high-molecular unsaturated ketones and conversion products thereof and to a process for their production.

We have found that industrially valuable products suitable as assistants for the textile, leather, lacquer and like industries can be obtained by converting the ketones obtainable by the condensation of aldehydes containing from 4 to 8 carbon atoms in the molecule and ketones containing from 3 to 5 carbon atoms in the molecule into unsaturated ketones of high molecular weight while doubling the molecule by treatment with alkali or other agents or by catalytic or other methods.

For the process according to this invention there may be used for example the unsaturated ketones of high molecular weight obtainable from comparatively low molecular aldehydes, such as normal-butyraldehyde, isobutyraldehyde, isoamyl-aldehyde, normal-hexylaldehyde, isohexylaldehyde, isoheptylaldehyde, 2-ethylhexylaldehyde, benzaldehyde and the like by condensation with comparatively low molecular ketones, in particular methyl alkyl ketones, as for example acetone, methyl ethyl ketone, methyl propyl ketone and the like. Among the aldehydes, the following are especially suitable in the present case; isobutyraldehyde, isoamylaldehyde, isohexylaldehyde, isoheptylaldehyde and isooctylaldehyde; these may be readily obtained on a technical scale by catalytic dehydrogenation of the oxgyen-containing hydrogenation products of high molecular weight obtainable in the hydrogenation of carbon monoxide to methanol. Mixtures of the said aldehydes or ketones may also be employed with great advantage. The condensation of the aldehydes with the ketones to form the ketones of high molecular weight forming the intermediate products according to this invention may be carried out in the presence of usual condensing agents for example in the presence of alkali, in particular alcoholic alkali, at ordinary or elevated temperature. It has also been found to be very suitable to use aqueous alkaline earth hydroxides as condensing agents. The advantage of this special method of working consists in the fact that a less valuable condensing agent is used and moreover the condensation takes place quite gradually so that the heat of reaction may be led away quite readily by cooling and decomposition reactions thus avoided. When saturated initial materials are used, the resulting ketones contain only one olefinic linkage in the molecule; when unsaturated initial materials are used, the resulting ketones contain a corresponding number of olefinic linkages.

The aforesaid ketones are condensed with each other; this may be effected by treatment with suitable condensing agents, for example by the addition of basic reacting substances such as potassium hydroxide, sodium hydroxide, ammonia, organic amines, such as methylamine, dimethylamine, piperidine, and the like; the treatment with alcoholic caustic alkali is especially advantageous. Catalytic or other methods may also be employed. In this way unsaturated ketones of high molecular weight are obtained which contain at least three olefinic linkages and which, depending on the initial materials, may contain more. The said ketones are obtained in a good yield; they are light yellow or dark yellow colored viscous liquids.

The resulting unsaturated ketones of high molecular weight may then be subjected to reduction to the corresponding alcohols, the procedure if desired being such that the double linkages present remain wholly or partly in the molecule. The reduction may be effected for example by treating the ketones of high molecular weight with hydrogen in the presence of catalysts, such as nickel, cobalt, copper, platinum and the like, the catalytically acting metals being applied to carrier substances if desired. It is frequently preferable to carry out the reduction while using catalysts immune to poisoning, such as are described for example in the British Patent No. 436,214. The reduction may, however, also be carried out with zinc and hydrochloric acid, sodium and alcohol or other reducing agents. In the said manner, the secondary alcohols are obtained in the form of colorless more or less viscous liquids. The course of the reaction for the recovery of the said high-molecular ketone and the corresponding secondary alcohols is, for example when using isohexylaldehyde and acetone as initial materials, as follows:

substances, which term is intended to mean polyhydric aliphatic alcohols or polyalcohols of low molecular weight, as for example ethylene glycol,

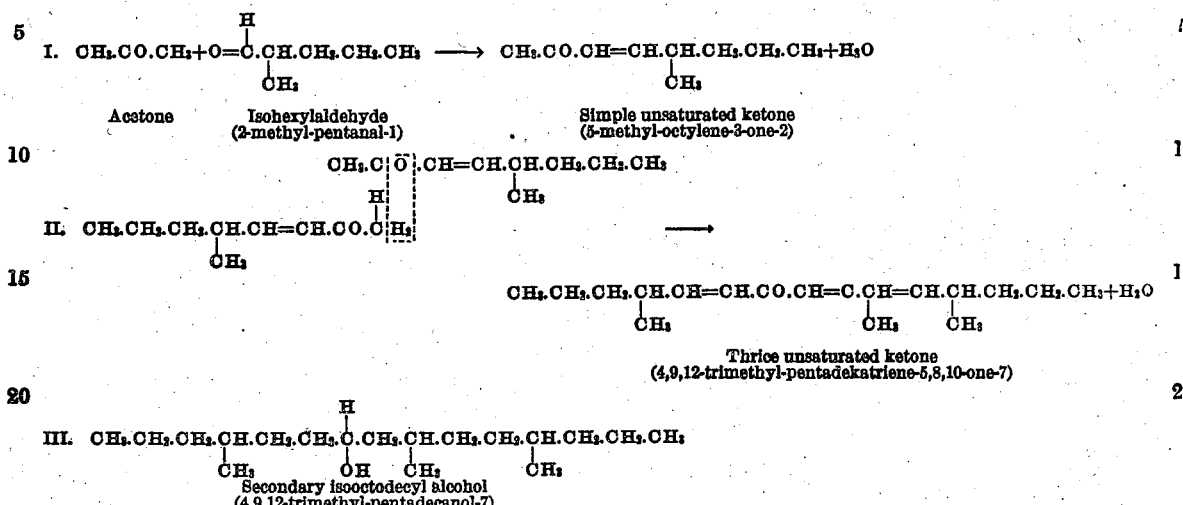

The process according to this invention thus offers the possibility of obtaining alcohols of high molecular weight having technically very valuable properties while using comparatively low molecular and readily accessible initial materials. These alcohols may be used with advantage for a great variety of industrial purposes, as for example as solvents, softening agents, in particular for lacquers, artificial compositions and the like, and also as foam-subduing agents and as additional substances for dressing or waxing masses and the like. They are also well suited for use as intermediate products for the preparation of valuable organic compounds.

It is especially advantageous to convert the alcohols into water-soluble products. This may be carried out for example by a sulphonation, whereby sulphonation products are obtained which are very valuable technically. The sulphonation may be carried out for example with concentrated sulphuric acid, fuming sulphuric acid, chlorsulphonic acid and the like, if desired while using solvents, such as ether, carbon tetrachloride and the like. It is especially advantageous to carry out the sulphonation with the addition of chlorides or anhydrides of organic acids, such as acetyl chloride, acetic anhydride, propionic anhydride and the like; the addition of small amounts of agents which bind water, as for example phosphorus pentoxide, is also frequently preferable. The sulphonation is usually carried out at temperatures below about 20°, preferably between about zero and 5° C. The working up of the sulphonation product is effected in the usual manner while neutralizing with alkalies, ammonia or amines, as for example mono-, di- or tri-methylamine, -ethanolamine and the like, whereby washing, wetting, dispersing and like agents of great industrial value are obtained. In the form of their alkali salts, the sulphonation products are practically colorless solid masses the solubility of which in water decreases somewhat with increasing molecular weight of the alcohol used for the sulphonation. Products having especially good foaming power are obtained by mixing the sulphonation products of alcohols of different molecular weight.

The conversion of the high molecular alcohols into water-soluble or readily dispersable compounds may also be carried out by introducing into these alcohols radicles of polyhydric alcohol substances, which term is intended to mean polyhydric aliphatic alcohols or polyalcohols of low molecular weight, as for example ethylene glycol, 1,2-propylene glycol, glycerine, diethylene, triethylene or tetraethylene glycol or polyglycerine. The process is advantageously carried out by causing the alkylene oxides corresponding to the said polyhydric alcohols, in particular ethylene oxide or glycide, to act on the secondary aliphatic alcohols of high molecular weight. For example the said alcohols of high molecular weight may be caused to react with 2, 5, 10, 20, 30 or more molecular proportions of ethylene oxide and the like. It is advantageous to work with the addition of small amounts of additional substances having an alkaline reaction, such as caustic soda, caustic potash, sodium ethylate, soda or sodium acetate, or of surface-active substances, such as bleaching earths and the like. Generally speaking the alkylene oxide, for example, is led in the gaseous phase into the alcohol of high molecular weight until the desired amount has been absorbed, or the alkylene oxide is added in the liquid form in the calculated amount to the alcohol of high molecular weight, the mixture then being heated in a closed vessel to a moderately high temperature, as for example to from 50° to 150° C. until the pressure has practically disappeared.

The polyether radicles may also be introduced as such into the alcohols, for example by replacing a hydroxyl group, for example of triethylene glycol, by chlorine and then causing the chlorether to react with the alcohol of high molecular weight in the presence of basic substances.

The products obtained in the said manner are readily soluble or readily dispersable in water and may be employed with great advantage as assistants for the textile, leather, lacquer and like industries.

The following examples will further illustrate the nature of this invention but the invention is not restricted to these examples. The parts are by weight.

*Example 1*

A mixture of 100 parts of isohexylaldehyde (2-methylpentanal-(1)), 200 parts of acetone, 100 parts of water and 15 parts of barium hydroxide is heated under reflux for 10 hours. When the condensation is completed, the excess of acetone is distilled off and the reaction product separated from the baryta liquor by sedimentation. The product is then washed with water and distilled under a pressure of 10 millimeters (mercury gauge). 100 parts of 5-methyl-octylene-(3)-one-(2) are thus obtained which distil over between 70° and 85° C., mainly between 77° and 80° C.

The ketone obtained is introduced into a boiling solution of 5 parts of potassium hydroxide in 50 parts of methanol so rapidly that the mixture remains boiling by the heat of reaction developed. The reaction mixture is heated for half an hour under reflux, slightly acidified with hydrochloric acid and the methanol then removed by distillation. The residue is washed with water and then distilled. 80 parts of 4,9,12-trimethyl-pentadecatriene-(5,8,10)-one-(7) distil over between 140° and 160° C. under a pressure of 2 millimeters (mercury gauge), the main portion passing over between 151° and 156° C.

The resulting thrice-unsaturated ketone is treated under a pressure of 100 atmospheres with hydrogen in an autoclave at 200° C. with the addition of a catalyst obtained by the reduction of nickel oxide at 400° C. There is formed in a practically quantitative yield, by the hydrogenation of the three double linkages present in the molecule of the initial material and by reduction of the carbonyl group, the corresponding alcohol (4,9,12 - trimethyl - pentadecanol - (7)) which passes over as a colorless viscous liquid between 130° and 140° C. under a pressure of 2 millimeters (mercury gauge).

The alcohol obtained may be sulphonated for example in the following manner:

270 parts of the alcohol obtained as described above are introduced into a mixture of 130 parts of acetic anhydride and 130 parts of 100 per cent sulphuric acid at such a slow rate that the temperature in the sulphonation mixture does not exceed 10° C. After stirring vigorously for three hours, the sulphonation mixture is poured onto 5 parts of ice. After neutralization with caustic soda solution, the sulphonation product separates as an oily layer on the aqueous salt solution and may readily be separated. By steam distillation, unsulphonated constituents are removed from the sulphonation product, the solution containing the sulphonate being evaporated to dryness. A colorless, completely water-soluble, solid product is obtained the aqueous solutions of which have very good foaming, wetting, and emulsifying power.

Example 2

100 parts of isoamylaldehyde are introduced rapidly into a boiling mixture of 20 parts of acetone, 100 parts of water and 15 parts of barium hydroxide. When the spontaneous heating ceases, the mixture is heated under reflux for another 2 hours, cooled and acidified with hydrochloric acid after separating the baryta liquor. The acetone is then distilled off or expelled with steam, the reaction product is washed with water until neutral and then distilled under reduced pressure, whereby 75 parts of 5-methyl-heptylene-(3)-one-(2) pass over between 80° and 90° C. under a pressure of 20 millimeters (mercury gauge).

100 parts of this ketone are introduced into a boiling solution of 200 parts of methanol and 5 parts of potassium hydroxide and, after the spontaneous heating has ceased, heated under reflux for half an hour. After acidification with hydrochloric acid, the reaction mixture is freed from methanol by distillation and the ketone (3,8,11-trimethyl-tridecatriene-(4,7,9)-one-(6)) is distilled under reduced pressure after washing. The ketone distils over in the pure form between 150° and 160° C. under a pressure of 10 millimeters (mercury gauge). The hydrogenation of the thrice-unsaturated ketone to the corresponding saturated alcohol is effected in the manner described in Example 1. The 3,8,11-trimethyl-tridecanol-6 is thus obtained as a colorless, slightly viscous liquid having a boiling point of from 150° to 160° C. under a pressure of 10 millimeters (mercury gauge).

The resulting product may also be sulphonated, for example by introducing 1.9 parts of the said alcohol while stirring very vigorously into 2.6 parts of a mixture, cooled to 5° C., of equal parts of acetic anhydride and 100 per cent sulphuric acid, the temperature being kept below about 10° C. After stirring for four hours, the sulphonation mixture is poured onto 5 parts of ice and further worked up as described in Example 1. The sulphonation product is obtained in the form of a pale yellowish friable mass the aqueous solutions of which have good washing and wetting power.

Example 3

A solution of 200 parts of acetone, 100 parts of water and 15 parts of barium hydroxide is heated to boiling under reflux, 100 parts of isobutyraldehyde being introduced so rapidly, but without external supply of heat, that the solution remains boiling. When the reaction is completed, the mixture is kept for another hour at the boiling temperature. After cooling, the baryta liquor and the barium hydroxide which has crystallized out are separated off, the reaction product is acidified with hydrochloric acid and treated with steam after distilling off the acetone. After washing with water, the product is distilled, whereby about 90 parts of 5-methyl-hexylene-(3)-one-(2) pass over between 60° and 70° C. under a pressure of 20 millimeters (mercury gauge) or between 153° and 158° C. under atmospheric pressure.

100 parts of 5-methyl-hexylene-(3)-one-(2) are introduced into a boiling solution of 200 parts of methanol and 5 parts of potassium hydroxide, spontaneous heating taking place. The reaction mixture is then heated to boiling under reflux for half an hour. After cooling, it is neutralized with hydrochloric acid and freed from methanol by distillation. After washing with water, the product is distilled under a pressure of 10 millimeters (mercury gauge) whereby 75 parts of the thrice-unsaturated ketone 2,7,10-trimethyl-undecatriene-(3,6,8)-one-(5) pass over between 140° and 150° C.

The ketone obtained may be converted into the corresponding alcohol by hydrogenation, the procedure described in Example 1 being followed. The alcohol obtained (2,7,10-trimethyl-undecanol-(5)) boils between 130° and 134° C. under a pressure of 10 millimeters (mercury gauge) and is a colorless, slightly viscous liquid.

In order to prepare the sulphonation product, 170 parts of the alcohol are slowly introduced while stirring well into a mixture of 130 parts of 100 per cent sulphuric acid and 130 parts of acetic anhydride at a temperature of 5° C. The sulphonation mixture is then stirred for 2 hours at from 5° to 8° C.; then, for the purpose of completing the sulphonation, 10 parts of phosphorus pentoxide are added and the whole stirred for another hour. It is then poured onto ice and worked up as described in Example 1. The sulphonation product is obtained in the form of a colorless, white, pulverulent mass the aqueous solutions of which have a high foaming and calcium soap dispersing power.

Example 4

A mixture of 100 parts of isoheptylaldehyde (2,4-dimethylpentanal-(1)), 200 parts of acetone, 100 parts of water and 15 parts of barium hydroxide is heated to boiling under reflux for 12 hours. After cooling, the undissolved barium hydroxide is removed by filtration and the aqueous barium hydroxide solution separated from the supernatant oily layer by running off. The reaction product is acidified with dilute hydrochloric acid and the excess of acetone is removed by distillation. The distillation residue is washed with water and distilled in vacuo after drying. After a small first runnings of unchanged aldehyde, 100 parts of 5,7-dimethyl-octene-(3)-one-(2) distil over between 85° and 92° C. under a pressure of 10 millimeters (mercury gauge).

The ketone obtained is introduced into a hot solution of 5 parts of potassium hydroxide in 200 parts of methanol, the mixture being heated for 2 hours to boiling under reflux. It is then acidified with dilute hydrochloric acid and the methanol is distilled off. The distillation residue is washed with water and distilled under greatly reduced pressure after drying. 70 parts of 2,4,9,12,14 - pentamethyl - pentadecatriene-(5,8,10)-one-(7) are obtained; it passes over as a yellowish liquid at from 170° to 173° C. under a pressure of 2 millimeters (mercury gauge).

The hydrogenation of the thrice-unsaturated ketone is effected in the manner described in the foregoing examples. The 2,4,9,12,14-pentamethyl-pentadecanol-7 distils over as a colorless, very viscous liquid between 155° and 160° C. under a pressure of 2 millimeters (mercury gauge).

The sulphonation of the resulting alcohol may be carried out according to Example 1. The sodium salt of the sulphonation product is a pale yellow colored friable mass which in aqueous solution has an excellent washing power, in particular for wool soiled with oil. The solution also has a very good wetting power for wool and cotton.

Example 5

A mixture of 100 parts of acetone, 50 parts of water and 7.5 parts of barium hydroxide is heated to boiling under reflux for some time, 50 parts of normal-butyraldehyde then being added to the mixture in the course of 10 minutes. The reaction mixture is then cooled to room temperature and the barium hydroxide solution removed. After acidification with dilute hydrochloric acid, the excess of acetone is distilled off and the residue is washed with water and dried. By distillation there are obtained 40 parts of heptene(3)-one-(2) which passes over between 70° and 80° C. under a pressure of 10 millimeters (mercury gauge).

The ketone obtained is introduced as rapidly as possible into a boiling solution of 18 parts of potassium hydroxide in 800 parts of methanol and the mixture heated to boiling under reflux for 15 minutes. After cooling, the product is acidified with dilute hydrochloric acid, the methanol is distilled off and the residue is washed with water and dried with Glauber's salt in vacuo. The product is distilled under a pressure of 10 millimeters (mercury gauge). 20 parts of 8-methyl-tridecatriene-(4,7,9)-one-(6) distil over between 150° and 160° C.

The hydrogenation of the unsaturated ketone to the corresponding alcohol may be carried out in the manner described in Example 1; the resulting 8-methyl-tridecanol distils over between 140° and 145° C. under a pressure of 10 millimeters (mercury gauge). The sulphonation of the alcohol may also be carried out in the manner described in Example 1, the sodium salt of the sulphonation product being obtained in the form of an almost colorless mass the aqueous solutions of which have a strong foaming and emulsifying power.

Example 6

A mixture of 1 part of ethylhexylaldehyde (2-ethylhexanal-1) and 2 parts of acetone is introduced into a solution of 0.15 part of barium hydroxide in 1 part of water and the whole is then boiled for 12 hours under reflux while intensely stirring. After distilling off the exceeding acetone and separating the barium hydroxide solution the reaction product is distilled under a pressure of 12 millimeters (mercury gauge). After a first runnings of 10 per cent of the reaction product consisting of unchanged ethylhexylaldehyde the condensation product distils over between 120° and 128° C.; it consists mainly of 5-ethyl-nonylene-3-one-2.

1 part of the aforesaid product is introduced into a solution of 0.05 part of potassium hydroxide in 1.6 parts of methanol; the mixture is then boiled for 2 hours. After acidifying with diluted sulphuric acid the methanol is distilled off. The reaction product is washed with water, dried and then distilled in high vacuo. After a first runnings of 12 per cent of the reaction mixture consisting of unchanged 5 - ethyl-nonylene-(3)-one-(2) the condensation product distils from 180° to 200° C. under a pressure of 2 millimeters (mercury gauge) in an amount of 75 per cent of the whole reaction mixture; it consists nearly completely of 5,13-diethyl-10-methyl-heptadecatriene-(6,9,11)-one-8. A residue of 13 per cent calculated on the whole reaction mixture remains in the distilling vessel.

The hydrogenation of the said thrice-unsaturated ketone to the corresponding alcohol (5,13-diethyl-10-methyl-heptadecanol-8) is effected while employing nickel as catalyst in the manner as described in the preceding examples.

For carrying out the sulphonation 40 parts of the said alcohol are slowly introduced at 10° C. into a mixture of 20 parts of acetic anhydride and 22 parts of 100 per cent sulphuric acid, the mixture being then stirred for 2 hours. It is then poured onto ice and neutralized with caustic soda solution. The supernatant layer formed which contains the sulphonation product is separated and converted in dry state by evaporation in vacuo. 50 parts of a dry yellowish powder are thus obtained which can advantageously be employed as wetting agent for wool and cotton and as washing agent for woolen goods.

Example 7

A mixture of 1 part of methyl-hexenyl aldehyde (2-methylpentene-2-al-1) and 1.6 parts of acetone are introduced into a solution of 0.15 part of sodium hydroxide in 1 part of water; the whole is then heated to boiling under reflux while stirring for 1½ hours. The working up of the reaction product is carried out as described in the preceding examples. 5-methyl-octadiene-(3,5)-one-2 distilling between 92° and 95° C. under a pressure of 10 millimeters (mercury gauge) is obtained in a yield of 80 per cent; the product is a yellowish, strongly ant-oxidizing liquor distilling between 92° and 95° C. under a pressure of 10 millimeters (mercury gauge).

The condensation of this product while doubling the molecule is then carried out by introducing 0.7 part of 5-methyloctadiene-(3,5)-one-2 in a solution of 0.04 part of potassium hydroxide in 1.55 parts of methanol and boiling the mixture under reflux for 1 hour. The working up of the reaction product is carried out as indicated in the preceding examples. Thus 75 per cent of the theoretical yield of 4,9,12-trimethyl-pentadecapentiene-(3,5,8,10,12)-one-7 are obtained.

By catalytical hydrogenation of this ketone under elevated pressure an alcohol is obtained which agrees as regards its properties with the 4,9,12-trimethyl-pentadecanol-7 obtained according to Example 1.

Example 8

1 part of isoheptyl aldehyde (2,4-dimethyl-pentanal-1) and 1.6 parts of methylethylketone are introduced into a solution of 0.15 part of barium hydroxide in 1 part of water, then the whole being heated to boiling under refluex for 4 hours. The working up of the reaction mixture is carried out as described in Example 1. In this manner 25 per cent of the aldehyde employed are obtained in unchanged state. 60 per cent of the aldehyde are converted into the 3,5,7-trimethyl-octylene-3-one-2 which distils between 80° and 90° C. under a pressure of 10 millimeters (mercury gauge).

1 part of the aforesaid high molecular ketone is introduced into a solution of 0.05 part of potassium hydroxide in 1.6 parts of methanol and heated under reflux for 2 hours. After working up the reaction mixture as described in Example 1 the (2,4,6,7,10,12,14)-heptamethyl-pentadecatriene-(5,8,10)-one-7 which has a boiling point of 185° to 200° C. under a pressure of 10 millimeters (mercury gauge) is obtained in a yield of 75 per cent of the theoretical yield. By hydrogenating this product while working under elevated pressure and employing finely divided nickel as catalyst (2,4,6,9,10,12,14) heptamethylpentadecanol-7 is obtained in a theoretical yield.

By sulphonating the aforesaid alcohol while employing a mixture of acetic anhydride and sulphuric acid and neutralizing the sulphonation product with caustic soda solution the sodium salts of the sulphuric acid ester of the said alcohol is obtained, which represents after evaporating to dryness a yellow powder having an excellent wetting and washing power.

Example 9

3 parts of metallic sodium are dissolved while heating in 500 parts of the 4,9,12-trimethyl-pentadecanol-7 obtainable according to Example 1; gaseous ethylene oxide is then led into the solution at 150° C. until the increase in weight amounts to about 500 parts. After cooling, a practically colorless, semi-solid mass is obtained which is practically completely soluble in water. The aqueous solutions of the product have an excellent wetting power even when in a state of strong dilution.

Example 10

2 parts of sodium methylate are added to 100 parts of 2,4,9,12,14-pentamethyl-pentadecanol-7 (obtainable according to Example 4) and then a current of ethylene oxide is led in at a temperature of 140° C., preferably while stirring. The ethylene oxide is absorbed smoothly. When 175 parts of ethylene oxide have been absorbed, the current of ethylene oxide is shut off. After cooling and neutralizing with acetic acid, a pasty, yellowish product is obtained which dissolves in water giving an entirely clear solution. The aqueous solution has a considerable wetting power. The product is distinguished in particular by an excellent washing action for cotton.

Example 11

3 parts of sodium methylate are added to 100 parts of 5,13-diethyl-10-methyl-heptadecanol-8 (prepared according to Example 6) and the whole heated to 150° C. At the said temperature, a vigorous current of ethylene oxide is led in while stirring until the increase in weight amounts to 108 parts. After cooling and neutralizing with glacial acetic acid, a yellowish paste is obtained. The product is a good wetting agent; it has a high foaming power and is distinguished by great washing power for wool and especially for cotton.

Example 12

4 parts of sodium methylate are added to 100 parts of 4,9,12-trimethyl-pentadecanol-7 and the whole heated to 145° C.; a current of gaseous propylene oxide is led in until the increase in weight amounts to 20 parts. Ethylene oxide gas is then led in until an increase in weight of a further 80 parts has taken place. After cooling and neutralizing with acetic acid, a pasty reaction product is obtained. It has excellent washing, wetting and emulsifying properties.

What we claim is:

1. Process for the production of high molecular unsaturated ketones which comprises heating a ketone obtainable by the condensation of aldehydes containing from 4 to 8 carbon atoms with ketones containing from 3 to 5 carbon atoms in the presence of a basic reacting substance as condensing agent.

2. Process for the production of high molecular unsaturated ketones which comprises heating an aliphatic ketone obtainable by the condensation of aliphatic aldehydes containing from 4 to 8 carbon atoms with ketones containing from 3 to 5 carbon atoms in the presence of a basic reacting substance as condensing agent.

3. Process for the production of high molecular unsaturated aliphatic ketones which comprises heating an aliphatic ketone obtainable by the condensation of aliphatic aldehydes containing from 4 to 8 carbon atoms with ketones containing from 3 to 5 carbon atoms in the presence of an alcholic caustic alkali.

4. The process for the production of high-molecular unsaturated ketones which comprises heating a ketone obtainable by the condensation of an aldehyde containing from 4 to 8 carbon atoms with a ketone containing from 3 to 5 carbon atoms in the presence of a caustic alkali and methanol at the boiling temperature of the methanol.

5. A high-molecular ketone having at least 14 carbon atoms corresponding to the general formula

wherein R is a hydrocarbon radical containing at least 3 carbon atoms, $R_1$ and $R_2$ are alkylene radicals containing together at least three olefinic double linkages, the said ketone being substituted by at least one alkyl radical.

6. A high-molecular ketone having at least 14 carbon atoms corresponding to the general formula $$R-R_1-CO-R_2-R$$

wherein R is an aliphatic hydrocarbon radical containing at least 3 carbon atoms, $R_1$ and $R_2$ are alkylene radicals containing together at least three olefinic double linkages, the said ketone being substituted by at least one alkyl radical.

7. A high-molecular ketone having from 14 to 26 carbon atoms corresponding to the general formula $$R-R_1-CO-R_2-R$$

wherein R is a hydrocarbon radical containing at least 3 carbon atoms, $R_1$ and $R_2$ are alkylene radicals containing together at least three olefinic double linkages, the said ketone being substituted by at least one alkyl radical.

KURT LOEWENBERG.
KARL SMEYKAL.